(12) United States Patent
Gustafson

(10) Patent No.: US 7,801,794 B2
(45) Date of Patent: Sep. 21, 2010

(54) EFFICIENT ELECTRICITY SYSTEM

(75) Inventor: Leif Gustafson, Järfälla (SE)

(73) Assignee: OMX Technology AB, Stockholm (SE)

( * ) Notice: Subject to any disclaimer, the term of this patent is extended or adjusted under 35 U.S.C. 154(b) by 1849 days.

(21) Appl. No.: 09/957,457

(22) Filed: Sep. 21, 2001

(65) Prior Publication Data

US 2003/0061143 A1    Mar. 27, 2003

(51) Int. Cl.
G06Q 40/00    (2006.01)
(52) U.S. Cl. .............................. 705/37; 705/35; 705/36
(58) Field of Classification Search ............... 705/1–45
See application file for complete search history.

(56) References Cited

U.S. PATENT DOCUMENTS

| | | | |
|---|---|---|---|
| 4,599,153 | A | 7/1986 | Bright |
| 4,771,185 | A | 9/1988 | Feron et al. |
| 4,803,632 | A * | 2/1989 | Frew et al. .................. 705/412 |
| 4,903,201 | A * | 2/1990 | Wagner ....................... 705/37 |
| 5,237,507 | A | 8/1993 | Chasek |
| 5,519,622 | A | 5/1996 | Chasek |
| 5,692,206 | A | 11/1997 | Shirley et al. |
| 5,970,479 | A * | 10/1999 | Shepherd ..................... 705/37 |
| 5,974,403 | A | 10/1999 | Takriti et al. |
| 6,115,698 | A | 9/2000 | Tuck |
| 2001/0027437 | A1 | 10/2001 | Turbeville et al. |
| 2001/0034663 | A1 | 10/2001 | Teveler et al. |
| 2001/0049651 | A1 | 12/2001 | Selleck |
| 2002/0019802 | A1 * | 2/2002 | Malme et al. ................. 705/37 |
| 2002/0029337 | A1 | 3/2002 | Sudia et al. |
| 2002/0059068 | A1 | 5/2002 | Rose et al. |
| 2002/0091626 | A1 * | 7/2002 | Johnson et al. ............... 705/37 |
| 2002/0103745 | A1 | 8/2002 | Lof et al. |

FOREIGN PATENT DOCUMENTS

| | | |
|---|---|---|
| CA | 2333367 | 2/1999 |
| CA | 2298432 | 4/2001 |
| EP | 0 999 418 | 5/2000 |
| JP | 2001216384 | 8/2001 |
| WO | WO 95/27945 | 10/1995 |
| WO | WO 9821667 * | 5/1998 |
| WO | WO9922284 | 5/1999 |
| WO | WO 01/29729 | 4/2001 |
| WO | WO 01/37184 | 5/2001 |
| WO | WO 01/41279 | 7/2001 |

(Continued)

OTHER PUBLICATIONS

International Search Report mailed Dec. 17, 2002 in corresponding PCT Application PCT/SE02/01668.

(Continued)

Primary Examiner—Mary Cheung
(74) Attorney, Agent, or Firm—Nixon & Vanderhye P.C.

(57) ABSTRACT

In an electricity marketplace, real time price information is fed from an price feeder directly to the electricity equipment or the meter of an end consumer, and the consumer is charged a price corresponding to the real-time price as set on an electricity trading exchange. The end consumer is thereby enabled to control his/her power consumption more efficiently. Thus, the end consumer can take advantage of low prices as well as reduce consumption when the price exceeds some limit.

19 Claims, 4 Drawing Sheets

FOREIGN PATENT DOCUMENTS

| | | |
|---|---|---|
| WO | WO 01/63460 | 8/2001 |
| WO | WO 02/17151 | 2/2002 |

OTHER PUBLICATIONS

U.S. Appl. No. 10/452,144, filed Jun. 3, 2003; Gustafson.

Official Action issued in corresponding Australian Application No. 2002334549 dated May 8, 2007.

Official Action issued in corresponding Japanese Application No. 2003-529371 dated Aug. 10, 2007.

Translation of Japanese official action, Nov. 14, 2006, in corresponding Japanese Application No. 2003-529371.

Official action, Oct. 5, 2009, in corresponding Candian Application No. 2,460,999.

\* cited by examiner

Principal information flow

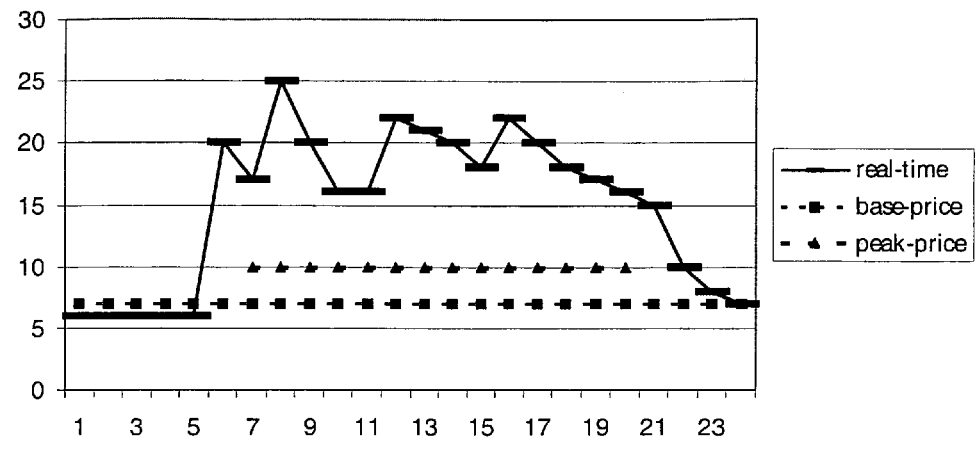
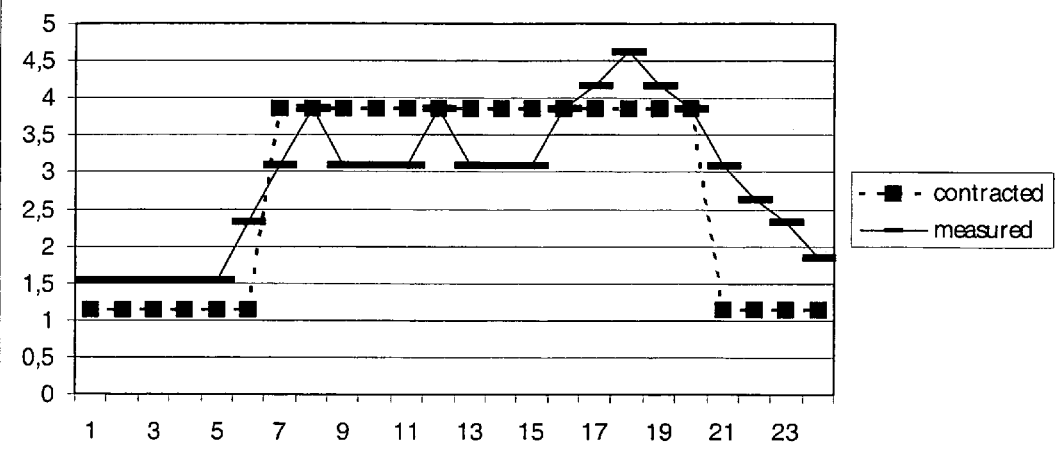

EFFICIENT ELECTRICITY SYSTEM

TECHNICAL FIELD

The technical field relates to using the resources in an electricity system more efficiently and to a de-regulated electricity market including different marketplaces for trading electricity.

BACKGROUND

A major purpose of a marketplace/trading exchange for commodities is to provide a central meeting point where people can buy and sell different commodity contracts. The people buying and selling at the market place are usually referred to as investors. The prices determined at the marketplace are generally interpreted as the "market value" of a particular contract. A marketplace for commodities in most cases attracts two different kinds of investors: hedgers and speculators.

Hedgers are people who invest money in a future contract to reduce the impact of future price changes in the market or to ensure access to a particular commodity in the future. Speculators, on the other hand, are people who invest money in the market when they see an economic benefit from it. For example, if a speculator is of the opinion that the price for a particular commodity contract is too high or too low, he may enter the market and buy or sell contracts in that particular commodity hoping to gain money from his transaction(s). The presence of speculators in the commodity market makes a positive contribution since liquidity in the market increases. Also, any "wrong pricing" in the market will be corrected by speculators, thereby enabling hedgers to hedge the market at a price, which is regarded as fair.

A commodity market that has had problems in attracting speculators is the electricity market. Where electricity is deregulated, electricity can be traded at different types of marketplaces. Contracts can be traded for short and long term periods. In both a sell and a buy situation, it can be necessary to hedge against price fluctuations.

A well-working marketplace needs active sellers and buyers where both parties are able to influence the market. In countries where the electricity market is deregulated, former monopoly companies still have a dominating role. Production companies are often in a position where they can use their position to set prices in the short-term contracts. This is particularly true for a real time balancing market, sometimes termed the "regulating market."

Consumption normally has no influence on the real-time price, and settlement will not take place based on the real time price, but the expected real-time price will have some impact on spot prices. As a consequence, existing electricity markets have failed to adequately attract speculators. There is therefore a need for a market where both sides have the power to influence the real-time price as well as spot prices. This will ensure that prices at which contracts are traded are regarded as fair prices and are not easy to manipulate. When this is the case, the electricity marketplace will attract all type of investors, including speculators.

A de-regulated electricity market includes a marketplace to trade spot contracts (day ahead and/or on the day). Spot contracts are for delivery usually during one hour, and sometimes shorter, such as during one half-hour. In addition there is a balancing market which is used by the grid operator to balance/regulate the physical electricity flow on the grid. The members of this market are those who can regulate up/down on very short notice and for short delivery periods, for example, 5 minutes. This market is dominated by the big electricity production companies and has only one buyer, the grid operator.

Furthermore, in a de-regulated electricity market there is a possibility for the consumer to choose the supplier. However, delivery contracts are drawn up in a way that the consumer will not be affected by the actual (real-time) price, and thus, he will have no incentive to increase/decrease his consumption. For example, if the real time price increases from 10 cents per kWh to one dollar per kWh, the consumers will not know, and thus, will not have the possibility to reduce consumption. Neither will they know of the opportunity to increase their momentary consumption and benefit if the real time price drops to 5 cents per kWh.

The overall goal when designing an electricity system is to make the electricity market as efficient as possible. If the profit is bigger to reduce consumption than to increase production, investments should be made on the consumption side and the opposite should be done if there is more profit in building new production units.

Accordingly, de-regulated electricity markets are still very inefficient because:
1—A very strong position for a few very large companies controls the real-time prices (balancing market), and the balancing market prices influence prices at the market.
2—The spot market prices are usually used to close open financial positions in longer contracts leading to a lack of speculators providing the market with liquidity.
3—The lack of incentive for the consumers to act on real-time price changes in the electricity market.

SUMMARY

It is an object to provide an improved and more efficient electricity system, and to create a marketplace were both production and consumption can react to changes in real time prices.

The inventor recognized that to provide an efficient and effective electricity system, the short-term electricity prices should be disseminated that show the actual "value of electricity" so that producers and consumers can react on these prices. The inventor designed an electricity system were both the buy and sell side can react on price information both sides receive actual price information. When electricity is traded on exchanges, price information is made available for the members and others with access to that information. The prices set by an exchange provide the exchange members with a way to determine how to run their business in a cost efficient manner.

For example, a process industry could choose to only perform very energy demanding tasks if the electricity price is at a level where process can be carried out with profit. As another example, a manufacturer could choose to use another way to produce steam by gas or oil if the electricity price is over a certain level.

However, today there is no infrastructure in place to support different types of electric equipment with actual price information. This means there is no way to program equipment using electricity to react on actual price information. The electricity systems today are designed based on the fact that electricity costs a fixed price, normally the same price all over the year or a price that varies a little between seasons or between day/night. Thus, today the producers have market power, especially in situations with limited production capacity compared to the demand.

In order to overcome this shortcoming, end consumers must also be able to adapt their power consumption with respect to the current electricity price, and thereby, receive a substantial economic benefit from doing so. In that case, the entire electricity market will become more efficient. This in turn will lead to producing and consuming electricity in a way that minimizes the overall cost. The real time price fluctuation as well as spot prices will also be lower in extreme situations. In the long run, providing such adaptability to end consumers will create a marketplace where, (as opposed to the existing systems), both seller and buyer will have impact on the price.

In accordance with a preferred example embodiment, real time electricity price as well as spot electricity price information is provided from a price information dissemination unit to consumer's electricity equipment, such as the consumer's meter, and the consumer is charged a price corresponding to the real-time price. (Other electricity price information may be used.) The end consumer can hedge his/her electricity price but may also control his/her physical power consumption based on the real-time price for electricity. Thus, the end consumer can take advantage of low prices as well as reduce consumption when the price exceeds some limit. Even if the consumer does not participate in the balancing market, the price on that market will drop if the situation changes from a need to increase production to a situation where the production will decrease.

BRIEF DESCRIPTION OF THE DRAWINGS

The present invention will now be described in more detail by way of non-limiting examples and with reference to the accompanying drawings, in which:

FIG. 4 illustrates prices for different contracts during one day for an exemplary electricity consumer, and FIG. 5 illustrates measured and contracted energy consumption during one day for the exemplary consumer.

DETAILED DESCRIPTION

Figure 1:
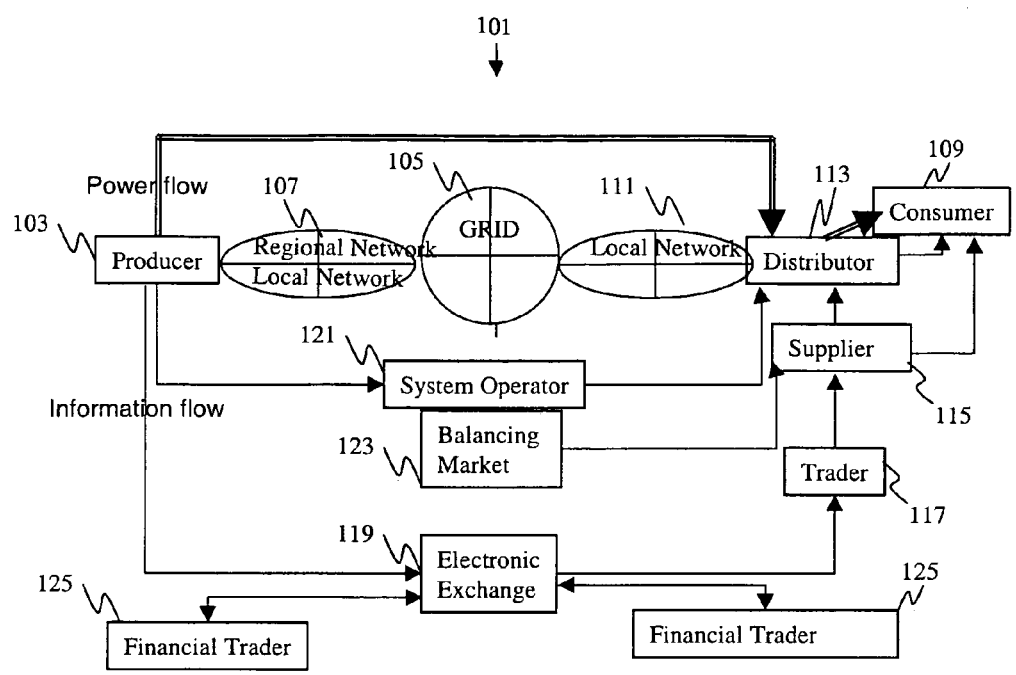
FIG. 1 is a general view of a deregulated electricity market including different entities and functions.

In FIG. 1, a general view of an electricity system 101 including different entities and functions is shown. The figure includes both the physical electricity flow as well as information flow including prices and volumes. The system 101 comprises a number of producers represented by Producer (or power generator) 103, which generates and sells physical electricity. The Producer 103 is connected to a common electricity grid 105 via a regional/local network 107 or directly to the grid. The system 101 further comprises a number of consumers represented by Consumer 109. The Consumer 109 uses electricity for different purposes and is connected to the common grid 105 via a local distribution network 111.

Connected to the electricity system 101 is a number of distributors represented by Distributor 113. The Distributor 113 manages (owns) the local distribution network 111 connected to the grid 105 or a regional network 107. Further, a number of suppliers represented by Supplier 115 are connected to the system 101. The Supplier 115 sells electricity to consumers, such as the Consumer 109. The Supplier can for example be a production company or a trading company or in some markets the Distributor 113.

The electrical system 101 also comprises an Exchange 119. The Exchange 119 is a marketplace where buyers and sellers of electricity contracts can meet. Contracts can be defined to cover spot contracts as well as future contracts and forward contracts with delivery from a day to more than a year. The marketplace also includes the spot market covering short-term contracts of usually one hour, but in some cases shorter and in some cases a block of hours. Different electricity markets can have different rules for the spot market. Connected to the Exchange 119 are a number of traders (hedgers), here represented by the Trader 117. The Trader 117 is a party acting on the electricity market by selling/buying electricity as physical contracts as well as financial contracts. The Exchange 119 is also connected to a number of Financial traders (speculators) 125. The financial traders 125 only buy and sell financial contracts and are hence never involved in actual delivery of electricity. The financial traders 125 only contribute liquidity in the Exchange 119 that constitutes the marketplace.

In the electricity system 101, there is also a System operator 121. The system operator 121 is responsible for managing the grid 105, e.g., the part of the grid designed for voltages above 150 kV. The System operator 121 is closely connected to a Balancing Market 123. The Balancing market 123 is used to balance the difference in real time between production, consumption and losses, in addition to automatic frequency control.

Figure 2:
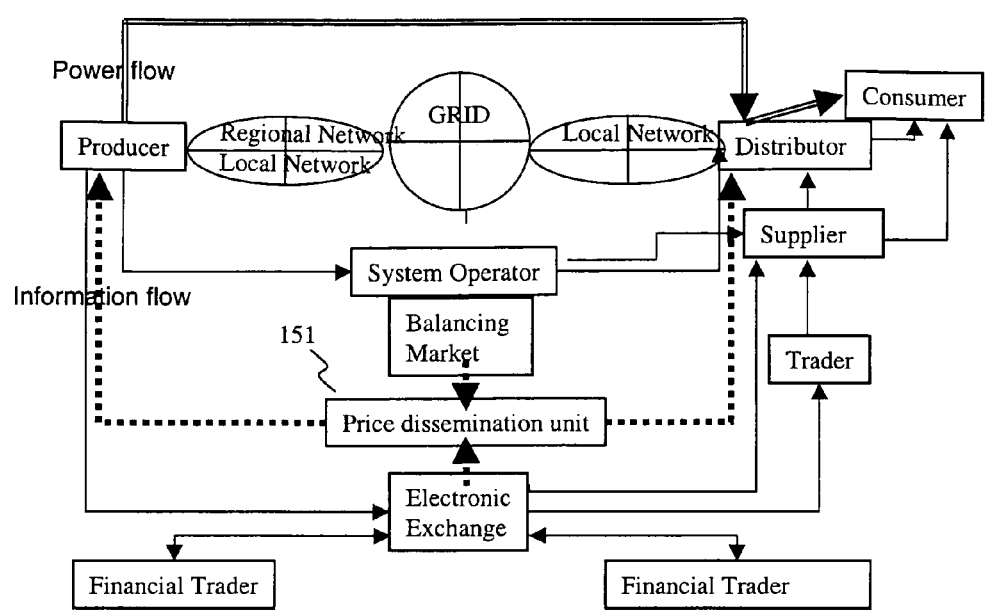
FIG. 2 is a view of an improved electricity system illustrating the flow of price information in real time.

In FIG. 2, real time price information flow in the electricity system 101 in FIG. 1 is shown. Price information is distributed by a price information dissemination (feeder) unit 151 which broadcasts real-time price information broadcasts to various parties. In this example, the price information dissemination unit 151 distributes real-time prices to the consumers. Other price information may be used. This can be done either directly or via the distributor. In a system where the distributor is responsible for sending price information to the consumers, the distributor can add information to the message relevant for how the distribution cost is settled. The transport mechanism can be based on different standard components such as different types of wireless communication, power line communication, telephone lines, wide area data networks and so on.

On the consumer side, the information will be received in standard equipment and used to control different electricity equipment such as water heaters, cooling equipment, motors, lights, and so on. Equipment for controlling different electricity is, for example, described in the UK patent application No GB 2309567 and in the U.S. Pat. No. 4,771,185. Real time prices (as well as spot prices) can also be displayed on a readable screen.

Figure 3:
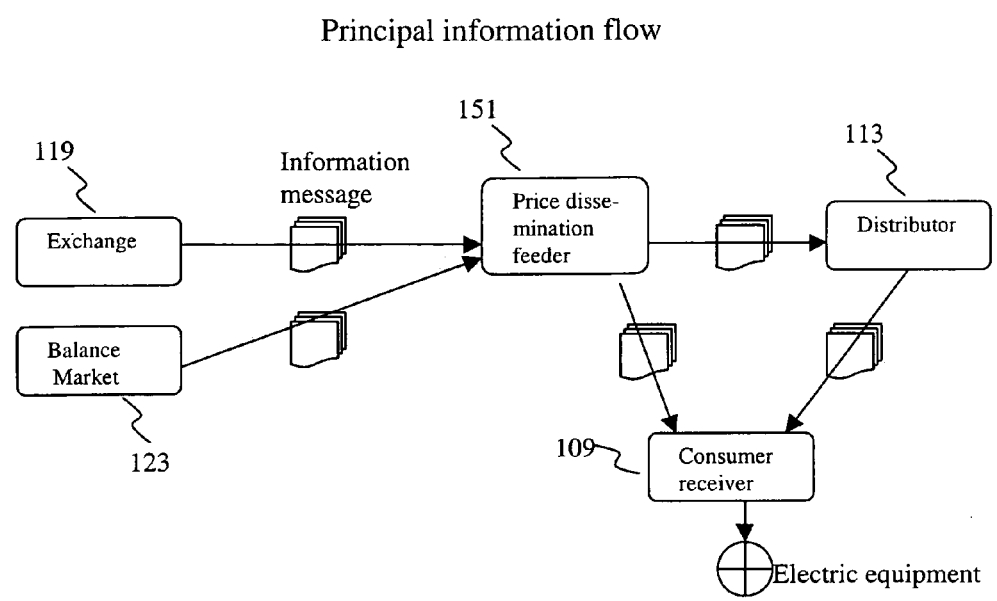
FIG. 3 is a view illustrating the major parts in the system in FIG. 2 used for dissemination of real time price information.

In FIG. 3, the infrastructure used for disseminating real time price information is shown. The core component in the real time price dissemination system is the unit 151. The unit 151, which can be co-located with the Exchange 119 or at any suitable location, preferably receives information both from the Exchange 119 and from the Balance market 123. The unit 151 receives price information from the different markets and compiles the price information into a message having a suitable format. The message is then transmitted to various receivers, for example, the consumers and/or the distributors. The following example parameters can preferably be included in a message transmitted by the unit 151:

| | |
|---|---|
| Information type: | as price information relating to electricity |
| ID Information: | different dissemination units can have different identities and thus be recognised by the receiver |
| Contract type: | as real-time price or spot price |
| Valid for (time): | for example in the form yymmdd:hhmm to ;hhmm |
| Price: | for example cents/kWh. Also different prices for up and down regulation can be included. |

The real-time prices can be different for different local areas and therefore the general message preferably also includes information regarding price per geographic area. The message can be packed as an XML-message (Extensible Markup Language) DI message (Electronic Data Interchange) or any other type of an open API (Application Program Interface.)

The system can operate in the following way. Consumer 109 is connected to the distributor 113 and has an electricity contract with the supplier 115. The Consumer 109 further has an electricity meter that meters electricity consumed by the Consumer 109. Assume that the consumer has an agreement involving two price-hedging contracts with a supplier. A first base contract is for the same power at all hours, for example, a yearly contract for 10 000 kWh, which means an hourly delivery of 10 000 divided by 8760 hours. The price is agreed to 7 cent/kWh, as is depicted in FIG. 4. The consumer also has a second, peak contract for a year of 10000 kWh. The peak period covers all working days between hours 6 and 20. The peak contract will be delivered during 70 hours a week and 3668 hours for the year. The price is set to 10 cent/kWh, as depicted in FIG. 4.

In the settlement process, the consumer will pay the supplier 10000*7 cents and 10000*10 cents equal to $1700 or approximately $4.66/day. The measured difference between the hedging contracts and measured actual consumption will be settled at the real time price. Different markets may employ different rules for what is determined to be the real-time price. The real-time price may be set to the price at the balance market or at the spot market for that particular time.

FIG. 4 is an example of the prices for a certain day, and FIG. 5 is an example of the contracts and the measured use of electricity on that day (the two contracts include approximately 66 kWh and measured volume is 70 kWh for the day). The settlement process includes the cost for the price hedging contracts, which in this example is $4.66/day, and in addition, the real time price multiplied with the difference between measured volume and contracted volume for each hour. Any suitable time period may be used when settling the real time prices (minutes, half-hours, etc.).

In this example, the consumer will be charged 19 cents to the real-time market. The cost for real time energy can be both positive and negative depending on when the consumption occurs and how many kWh are used. Thus, when the consumer consumes more power than he has purchased hedge contracts for, he will be charged the real-time price for this additional consumption. On the other hand, if he consumes less power than he has purchased hedge contracts for, the corresponding amount will be deducted from his invoice from the supplier. In some de-regulated markets, the real-time price for decreasing power generation and for increasing power generation differs. There is one price for increasing power production and another for decreasing power production. In a corresponding way, there will be two prices used in the settlement. In other words, consumption above the hedged contracts will be charged at one price, usually higher, and consumption below the hedged price will lead to a deduction at a second price, usually a lower price. In the system described above, it is preferred to use the real-time price set in the balancing market in the settlement, even though it would be possible to use any other price reflecting the real time price, such as the spot market prices, as an alternative.

In a system where the balancing market price is used in the settlement, it is nevertheless advantageous to provide the consumer with the spot market price. In other words, the message transmitted from the price information dissemination unit 151 preferably comprises both the prices at which increased power generation and decreased power generation are traded (balanced market prices) as well as the spot market prices set at the exchange. The reason for providing the spot market prices to the consumer is that in an efficient electricity market there will be a very strong correlation between the spot market price and the price at the balancing market. Hence, the spot price provides a good indication on what the real-time price will be in the very near future. The consumer can benefit from this information by planning ahead certain power demanding activities.

The system described herein places all electricity consumers in a position where they can control their consumption pattern in response to the current price for production of electricity. The system permits balancing electricity production and electricity consumption at both sides, i.e., at the production side as well as the consumption side. In the past, this was not possible since no incentive for participating in this balancing existed at the consumption side. In addition, because the consumers can actively take part in the market, the electricity market will become more like traditional commodity markets and will more easily attract speculators. This in turn will increase liquidity on the electricity market, which will lead to better prices for people trading hedge contracts.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" or "step for" are used.

I claim:

1. An electricity distribution system, comprising:
   a number of producers and a number of consumers, each consumer receiving electrical power from a common electrical network connecting the producers with the consumers;
   a first trading system for trading electricity contracts corresponding to electricity to be distributed on said electricity distribution system;
   a price information dissemination unit, connected to said first trading system, for distributing price information corresponding to prices for the electricity contracts traded in the trading system;
   means for connecting each consumer with said price dissemination unit to enable each consumer to receive said price information; and
   means for enabling each consumer to vary the consumer's electricity consumption based on the received price information.

2. A system according to claim 1, further comprising means for settlement in response to the price information received from the trading system.

3. A system according to claim 1 wherein the first trading system is a balancing market of the electricity system, and wherein the price information is based on a real time price determined within the balancing market.

4. A system according to claim 1 wherein the first trading system is an exchange for trading electricity within the electricity system, and wherein the price information is based on a spot market price determined within the exchange.

5. A system according to claim 1, further comprising a second trading system for trading electricity contracts in the electricity system connected to the price information dissemination unit, wherein the price information is further based on prices for the contracts traded in the second trading system.

6. A price information dissemination unit for disseminating electricity price information to a number of consumers of electricity connected to an electricity network, the unit comprising:
   means, connected to a first trading system used for trading electricity contracts corresponding to electricity to be distributed on said electricity network, for receiving price information relating to prices at which electricity contracts are traded at the trading system,
   means for forming a price information message corresponding to the received prices, and
   means for transmitting the message to the consumers to enable each consumer to vary the consumer's electricity consumption based on the transmitted price information.

7. A price information dissemination unit according to claim 6, wherein the first trading system is a balancing market and the price information corresponds to a real time price determined within the balancing market.

8. A price information dissemination unit according to claim 6, wherein the first trading system is an exchange for trading electricity within the electricity system, and wherein the price information corresponds to a spot market price determined within the exchange.

9. A price information dissemination unit according to claim 6, further comprising:
   means connected to a second trading system used for trading electricity contracts corresponding to electricity to be distributed on said electricity network for receiving prices at which contracts are traded at the second trading system.

10. A method of settlement for use in an electricity distribution system comprising a number of producers and a number of consumers, each consumer receiving electrical power from an electrical network connecting the producers with the consumers, the method comprising the steps of:
    receiving from a first trading system for trading electricity contracts corresponding to electricity to be distributed on said electricity distribution system price information relating to the electricity contracts traded,
    forming a price information message corresponding to the received price information,
    transmitting the price information message to the consumers to enable each consumer to receive price information corresponding to the prices from the trading system and to vary the consumer's electricity consumption based on the received price information, and
    performing settlement based on the price information and on a response from the consumer to the price information.

11. An electricity distribution system, comprising:
    a number of producers and a number of consumers, each consumer receiving electrical power from an electrical network connecting the producers with the consumers:
    a first trading system for trading electricity contracts corresponding to electricity to be distributed on said electricity distribution system;
    a price information dissemination unit, connected to said first trading system, for receiving prices related to traded electricity contracts, generating price information corresponding to the received prices, and distributing the price information;
    a communication system for connecting each consumer with said price dissemination unit and enabling each consumer to receive said price information and to vary the consumer's electricity consumption based on the received price information; and
    control equipment, connected to the communication system, for enabling each consumer to vary the consumer's electricity consumption depending on the received price information.

12. A system according to claim 11, wherein the first trading system is a balancing market of the electricity system, and wherein the price information corresponds to a real time price determined within the balancing market.

13. A system according to claim 11, wherein the first trading system is an exchange for trading electricity within the electricity system, wherein the price information corresponds to a spot market price determined within the exchange.

14. A system according to claim 11, further comprising:
    a second trading system for trading electricity contracts in the electricity system connected to the price information dissemination unit, and wherein the price information corresponds to prices for the contracts traded in the second trading system.

15. A method for disseminating electricity price information to a number of consumers of electricity connected to an electricity network, comprising:
    receiving price information relating to prices at which electricity contracts corresponding to electricity to be distributed on the electricity network are traded at a first trading system,
    forming a price information message corresponding to the received prices, and
    transmitting the message to the consumers to enable each consumer to vary the consumer's electricity consumption based on the received price information.

16. The method according to claim 15, wherein the first trading system is a balancing market and the price information corresponds to a real time price determined within the balancing market.

17. The method according to claim 15, wherein the first trading system is an exchange for trading electricity within the electricity system, and wherein the price information corresponds to a spot market price determined within the exchange.

18. The method according to claim 15, further comprising:
    receiving prices at which contracts are traded at a second trading system used for trading electricity contracts.

19. The method according to claim 15, wherein the message is formatted as an XML-message (Extensible Markup Language), a DI message (Electronic Data Interchange), or any other type of an open API (Application Program Interface).

* * * * *